United States Patent
Mochizuki (10) Patent No.: US 9,547,357 B2
(45) Date of Patent: Jan. 17, 2017

(54) SYSTEM, APPARATUS, AND METHOD FOR INFORMATION PROCESSING

(71) Applicant: Toshihiro Mochizuki, Kanagawa (JP)

(72) Inventor: Toshihiro Mochizuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 196 days.

(21) Appl. No.: 14/316,973

(22) Filed: Jun. 27, 2014

(65) Prior Publication Data

US 2015/0019888 A1 Jan. 15, 2015

(30) Foreign Application Priority Data

Jul. 10, 2013 (JP) .................................. 2013-144623

(51) Int. Cl.
*G06F 1/32* (2006.01)
*G06F 11/30* (2006.01)

(52) U.S. Cl.
CPC ........... *G06F 1/3234* (2013.01); *G06F 1/3206* (2013.01); *G06F 11/3013* (2013.01); *G06F 11/3062* (2013.01); *G06F 11/3006* (2013.01)

(58) Field of Classification Search
CPC ... G06F 11/3058; G06F 1/3206; G06F 1/3234
See application file for complete search history.

(56) References Cited

U.S. PATENT DOCUMENTS

| | | | | |
|---|---|---|---|---|
| 8,644,771 B1* | 2/2014 | Delker | ................. | H04W 52/48 370/318 |
| 9,170,912 B1* | 10/2015 | Hu | ...................... | G06F 11/3062 |
| 2010/0325465 A1* | 12/2010 | Kazama | ................... | G06F 1/28 713/340 |
| 2011/0211851 A1* | 9/2011 | Imine | ................... | G06F 1/3209 399/37 |
| 2013/0057917 A1 | 3/2013 | Ohta | | |

(Continued)

FOREIGN PATENT DOCUMENTS

JP 2008-284753 11/2008
JP 2010-003037 1/2010

(Continued)

*Primary Examiner* — Thomas Lee
*Assistant Examiner* — Mohammad A Rahman
(74) *Attorney, Agent, or Firm* — Harness, Dickey & Pierce, P.L.C.

(57) ABSTRACT

A system includes apparatuses and a power collecting device for collecting power consumption information at power sources to which the apparatuses are connected, respectively. The apparatus includes a controller that sets the apparatus to a first state or a second state for a lower power consumption; a first obtaining unit that obtains, from the device, first associated information in which first information for identifying the sources is associated with second information indicating power consumption of the respective sources; a retaining unit that retains second associated information in which the first associated information is associated with the time when the first obtaining unit obtains the first associated information; a state determining unit that determines a state of the other apparatus; and a second obtaining unit that obtains third associated information corresponding to a period during which the apparatus is in the second state when the apparatus transits to the first state.

16 Claims, 6 Drawing Sheets

(56) References Cited

U.S. PATENT DOCUMENTS

| | | | |
|---|---|---|---|
| 2013/0109343 A1* | 5/2013 | Cheng | H04W 4/22 455/404.2 |
| 2014/0281632 A1* | 9/2014 | Kitajima | G06F 1/3206 713/323 |

FOREIGN PATENT DOCUMENTS

| | | |
|---|---|---|
| JP | 2010-200046 | 9/2010 |
| JP | 2013-058839 | 3/2013 |
| JP | 2014-179023 A | 9/2014 |

* cited by examiner

SYSTEM, APPARATUS, AND METHOD FOR INFORMATION PROCESSING

CROSS-REFERENCE TO RELATED APPLICATION

The present application claims priority to and incorporates by reference the entire contents of Japanese Patent Application No. 2013-144623 filed in Japan on Jul. 10, 2013.

BACKGROUND OF THE INVENTION

1. Field of the Invention

The present invention relates to a system, an apparatus, and a method for information processing.

2. Description of the Related Art

Conventionally, known has been a device (which will be hereinafter sometimes referred to as "smart tap") that is connected between an apparatus (for example, an information processing apparatus such as an MFP) and an outlet (power source) and measures a power consumption at the outlet to measure a power consumption of the apparatus. Also, known has been a method in which, in using a plurality of smart taps to which a plurality of apparatuses are connected, a base unit of the smart taps collects respective power consumptions measured by the smart taps and transmits a result of the collection to a personal computer for power management to cause a display of the result. For example, a technique disclosed in Japanese Patent Application Laid-Open No. 2010-200046 has been known as one example of a power management for an information processing apparatus such as an MFP.

Here, when an apparatus itself is enabled to display information indicating a power consumption of each apparatus instead of causing another device (a PC, for example) different from the apparatus to display the information indicating a power consumption of each apparatus, it is useful by saving a work for preparing and setting up the PC for power management. While each apparatus is to obtain information indicating a power consumption measured by each smart tap (power consumption information) through a communication with the base unit of the smart taps in this case, there arises a problem that an apparatus is not able to communicate with the base unit of the smart taps when the apparatus shifts to a sleep state, for example, and thereby not able to obtain power consumption information in a period during which the sleep state continues.

Though it is possible, by making such a setting as not to cause the apparatus to shift to the sleep state, to prevent an omission in obtaining power consumption information, it is not possible with this setting to reduce the power consumption sufficiently. In the first place, a visualization of a power consumption volume and a presentation thereof to a user are intended for encouraging the user to behave for energy saving to reduce the power consumption, and therefore the setting of not causing the apparatus to shift to the sleep state goes against the original intension of reducing the power consumption volume.

Therefore, there is a need for a system, an apparatus, and a method for information processing which enable an apparatus as a target for power consumption measurement to obtain power consumption information without omission while reducing one's own power consumption.

SUMMARY OF THE INVENTION

It is an object of the present invention to at least partially solve the problem in the conventional technology.

According to an embodiment, there is provided an information processing system that includes a plurality of information processing apparatuses; and a power collecting device that collects pieces of power consumption information at power sources to which the information processing apparatuses are connected, respectively. Each of the information processing apparatuses includes a state controller that performs, depending on conditions, a control of setting the information processing apparatus to a first state or a second state in which a power consumption at the information processing apparatus is smaller than the first state and which indicates that a communication with the power collecting device and the other information processing apparatus cannot be performed; a first obtaining unit that regularly obtains, from the power collecting device, first associated information in which pieces of first information for identifying the respective power sources are associated with pieces of second information indicating power consumption of the respective power sources, respectively; a retaining unit that retains second associated information in which the first associated information obtained by the first obtaining unit is associated with temporal information which indicates a time when the first obtaining unit obtains the first associated information; a state determining unit that determines a state of the other information processing apparatus; a second obtaining unit that obtains third associated information from the other information processing apparatus when the information processing apparatus transits from the second state to the first state, the third associated information indicating a portion corresponding to a period during which the information processing apparatus is in the second state, in the second associated information retained in the retaining unit provided in the other information processing apparatus determined to be in the first state; a generator that generates third information that indicates a power consumption of each of the information processing apparatuses based on information in which the second associated information retained in the retaining unit is combined with the third associated information; and a display controller that performs a control of displaying the third information.

According to another embodiment, there is provided an information processing apparatus that includes a state controller that performs, depending on conditions, a control of setting the information processing apparatus to a first state or a second state in which a power consumption at the information processing apparatus is smaller than the first state and which indicates that a communication with a power collecting device and another information processing apparatus cannot be performed, the power collecting device collecting pieces of power consumption information at power sources to which the information processing apparatuses are connected, respectively; a first obtaining unit that regularly obtains, from the power collecting device, first associated information in which pieces of first information for identifying the respective power sources are associated with pieces of second information indicating power consumption of the respective power sources, respectively; a retaining unit that retains second associated information in which the first associated information obtained by the first obtaining unit is associated with temporal information which indicates a time when the first obtaining unit obtains the first associated information; a state determining unit that determines a state of the another information processing apparatus; a second obtaining unit that obtains third associated information from the another information processing apparatus when the information processing apparatus transits from the second state to the first state, the third associated information indicating a portion corresponding to a period during which the information processing apparatus is in the second state, in the second associated information retained in the retaining unit provided in the another information processing apparatus determined to be in the first state; a generator that generates third information that indicates a power consumption of each of the information processing apparatuses based on information in which the second associated information retained in the retaining unit is combined with the third associated information; and a display controller that performs a control of displaying the third information.

According to still another embodiment, there is provided an information processing method that includes performing, depending on conditions, a control of setting an information processing apparatus to a first state or a second state in which a power consumption at the information processing apparatus is smaller than the first state and which indicates that a communication with a power collecting device and another information processing apparatus cannot be performed, the power collecting device collecting pieces of power consumption information at power sources to which the information processing apparatuses are connected, respectively; regularly obtaining, from the power collecting device, first associated information in which pieces of first information for identifying the respective power sources are associated with pieces of second information indicating power consumption of the respective power sources, respectively; retaining second associated information in which the first associated information is associated with temporal information which indicates a time when the first obtaining unit obtains the first associated information; determining a state of the another information processing apparatus; obtaining third associated information from the another information processing apparatus when the information processing apparatus transits from the second state to the first state, the third associated information indicating a portion corresponding to a period during which the information processing apparatus is in the second state, in the second associated information provided in the another information processing apparatus determined to be in the first state; generating third information that indicates a power consumption of each of the information processing apparatuses based on information in which the second associated information is combined with the third associated information; and performing a control of displaying the third information.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of a system, an apparatus, a method, and a program for information processing according to the present invention will be explained in detail below with reference to the accompanying drawings. While a case of applying an information processing system according to the present invention to a multifunction peripheral (MFP) is taken as an example in the explanation below, the present invention is not limited thereto. Here, the multifunction peripheral includes at least two functions among a printing function, a copying function, a scanning function, and a facsimile function.

Figure 1:
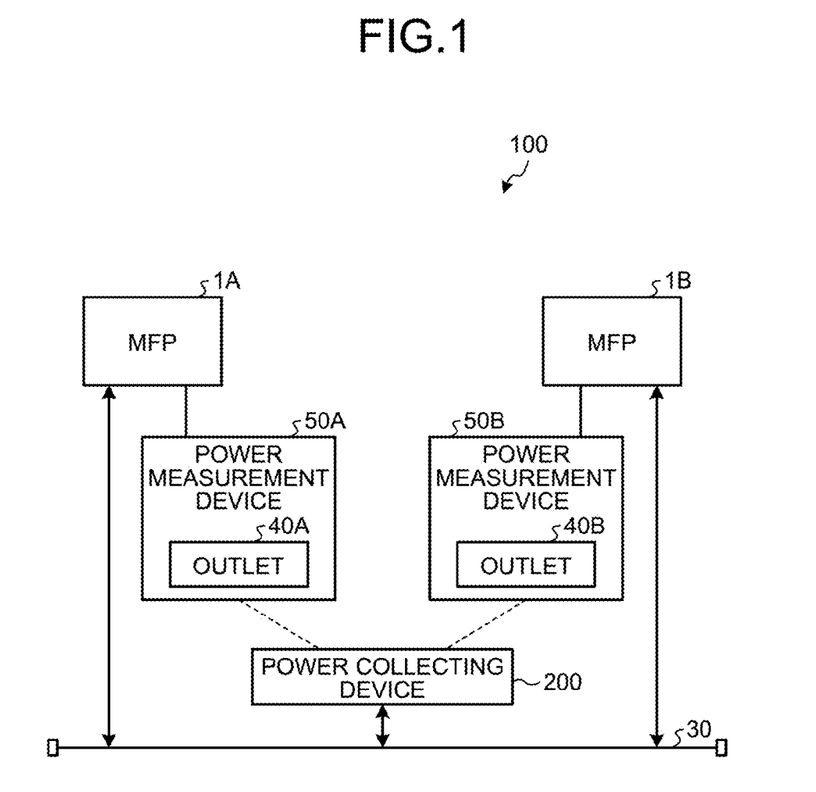
FIG. 1 schematically illustrates an example of a configuration of a system according to an embodiment.

FIG. 1 schematically illustrates an example of a configuration of a system 100 according to an embodiment. As illustrated in FIG. 1, the system 100 is provided with at least an MFP 1A, an MFP 1B, and a power collecting device 200. The MFP 1A, the MFP 1B, and the power collecting device 200 are connected via a wired network 30 so that a communication therebetween is enabled. Here, the connection style of the MFP 1A, the MFP 1B, and the power collecting device 200 is arbitrarily set and they may be connected via a wireless LAN, for example. In the explanation below, the MFP 1A and the MFP 1B with no need to discriminate therebetween are sometimes referred to simply as "MFP 1". While two MFPs 1 are illustrated in the example in FIG. 1, the configuration is not limited thereto and the number of MFPs 1 provided in the system 100 may be set arbitrarily.

In the example in FIG. 1, the MFP 1A is connected to an outlet 40A. A power consumption at the outlet 40A is measured by a power measurement device 50A. The MFP 1B is connected to an outlet 40B. A power consumption at the outlet 40B is measured by a power measurement device 50B. In the explanation below, the outlets 40A and 40B with no need to discriminate therebetween are referred to simply as "outlet 40", and the power measurement devices 50A and 50B with no need to discriminate therebetween are referred to simply as "power measurement device 50", sometimes.

Figure 2:
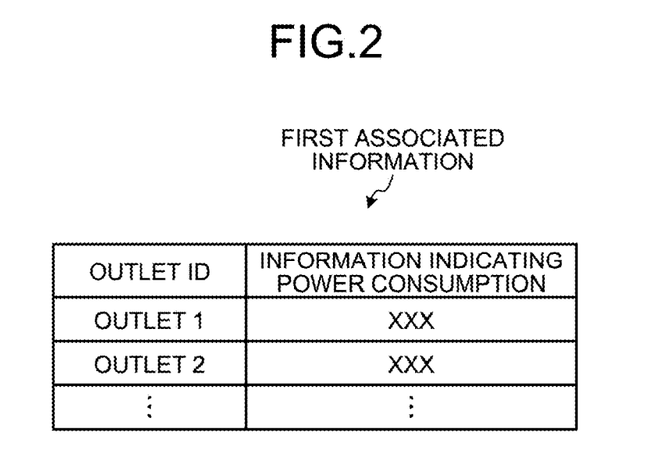
FIG. 2 illustrates an example of first associated information.

Each of the power measurement devices 50A and 50B is connected to the power collecting device 200 so that a communication with the power collecting device 200 is enabled. While the power collecting device 200 and each of the power measurement devices 50A and 50B are connected wirelessly in this example, the configuration is not limited thereto and may be a wired connection, for example. The power collecting device 200 has a function of communicating with each of the power measurement devices 50A and 50B regularly and collecting a power consumption at each outlet 40. In the embodiment, the power collecting device 200 communicates with each of the power measurement devices 50A and 50B regularly and generates first associated information in which information indicating a power consumption is associated with each outlet ID that identifies the outlet 40. Specifically, the power collecting device 200 can be considered to generate first associated information at predetermined intervals. FIG. 2 illustrates an example of the first associated information. In this example, the outlet ID and the information indicating a power consumption may be referred to as "first information" and "second information", respectively.

Since a capacity of a memory, not illustrated, provided in the power collecting device 200 is limited in the light of reducing the power consumption of the entirety of the system 100 in the embodiment, first associated information stored in the memory is configured to be, when new first associated information is created, rewritten by the new first associated information. However, the configuration is not limited to this and a predetermined number of pieces of first associated information may be retained in the memory of the power collecting device 200 and older first associated information may be discarded in series when new first associated information is created, for example.

Figure 3:
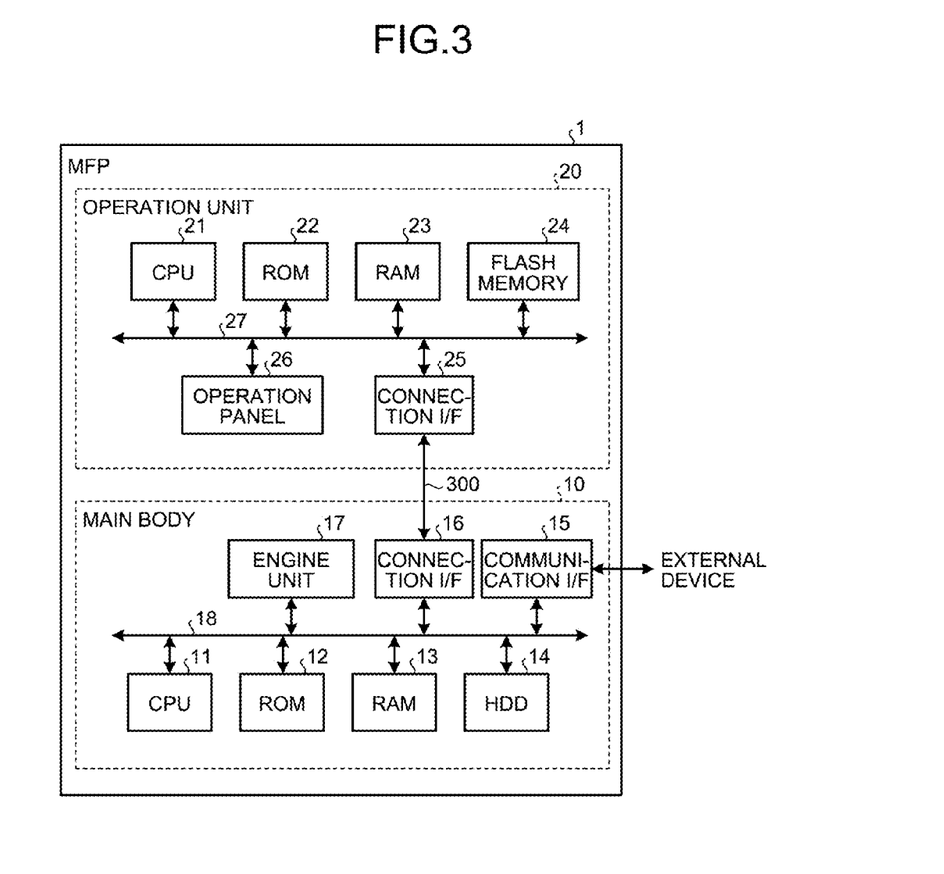
FIG. 3 illustrates an example of a hardware configuration of an MFP according to the embodiment.

Next, a configuration of the MFP 1 will be explained. FIG. 3 illustrates an example of a hardware configuration of the MFP 1. As illustrated in FIG. 3, the MFP 1 is provided with a main body 10 capable of realizing a variety of functions including a copying function, a scanning function, a facsimile function, and a printing function and an operation unit 20 that receives an input appropriate to an operation by a user. The main body 10 and the operation unit 20 are connected via a dedicated communication channel 300 so that a communication therebetween is enabled. For the communication channel 300, while a universal serial bus (USB) standard may be adopted for example, an arbitrary standard may be adopted irrespective of wired or wireless connection.

The main body 10 is capable of operating in accordance with an input received in the operation unit 20. The main body 10 is enabled to communicate with an external device such as a client personal computer (PC), other MFPs 1, and the power collecting device 200 and to operate in accordance with an instruction received from the external device.

A hardware configuration of the main body 10 will be explained below. As illustrated in FIG. 3, the main body 10 is provided with a CPU 11, a ROM 12, a RAM 13, a hard disk drive (HDD) 14, a communication interface (I/F) 15, a connection I/F 16, and an engine unit 17, which are connected to each other via a system bus 18.

The CPU 11 totally controls an operation of the main body 10. The CPU 11 uses the RAM 13 as a work area (work space) and executes programs stored in the ROM 12 or the HDD 14 to control the entire operation of the main body 10 and realize various functions including the copying function, the scanning function, the facsimile function, and the printing function.

The communication I/F 15 is an interface that enables a communication with an external device such as a client PC. The connection I/F 16 is an interface that enables a communication with the operation unit 20 via the communication channel 300.

The engine unit 17 is a hardware that performs a processing, except for a versatile information processing and communication, for realizing the copying function, the scanning function, the facsimile function, and the printing function. For example, the engine unit 17 is provided with a scanner (image reading unit) that scans and reads out an image of a document, a plotter (an image forming unit) that performs printing onto a sheet member such as paper, and a facsimile unit that performs a facsimile communication. The engine unit 17 may further be provided with special options such as a finisher that sorts printed sheet members and an automatic document feeder (ADF) that automatically feeds a document.

Next, a hardware configuration of the operation unit 20 will be explained. As illustrated in FIG. 3, the operation unit 20 is provided with a CPU 21, a ROM 22, a RAM 23, a flash memory 24, a connection I/F 25, and an operation panel 26, which are connected to each other via a system bus 27.

The CPU 21 totally controls an operation of the operation unit 20. The CPU 21 uses the RAM 23 as a work area (work space) and executes programs stored in the ROM 22 or the flash memory 24 to control the entire operation of the operation unit 20 and realize various functions, which will be explained later, including a display of information (image) in accordance with an input received from a user.

The connection I/F 25 is an interface that enables a communication with the main body 10 via the communication channel 300. The operation panel 26 receives inputs of various kinds in accordance with operations by a user and displays information of various kinds, for example, information indicating an operational status of the MFP 1 and information indicating a setting state. While the operation panel 26 is configured by a liquid crystal display (LCD) device equipped with a touch sensitive panel function in this example, the configuration is not limited thereto. For example, the operation panel 26 may be configured by an organic EL display device equipped with the touch sensitive panel function. Moreover, an operation unit such as a hardware key and a display unit such as a lamp may be provided in addition to this or in place of this.

Figure 4:
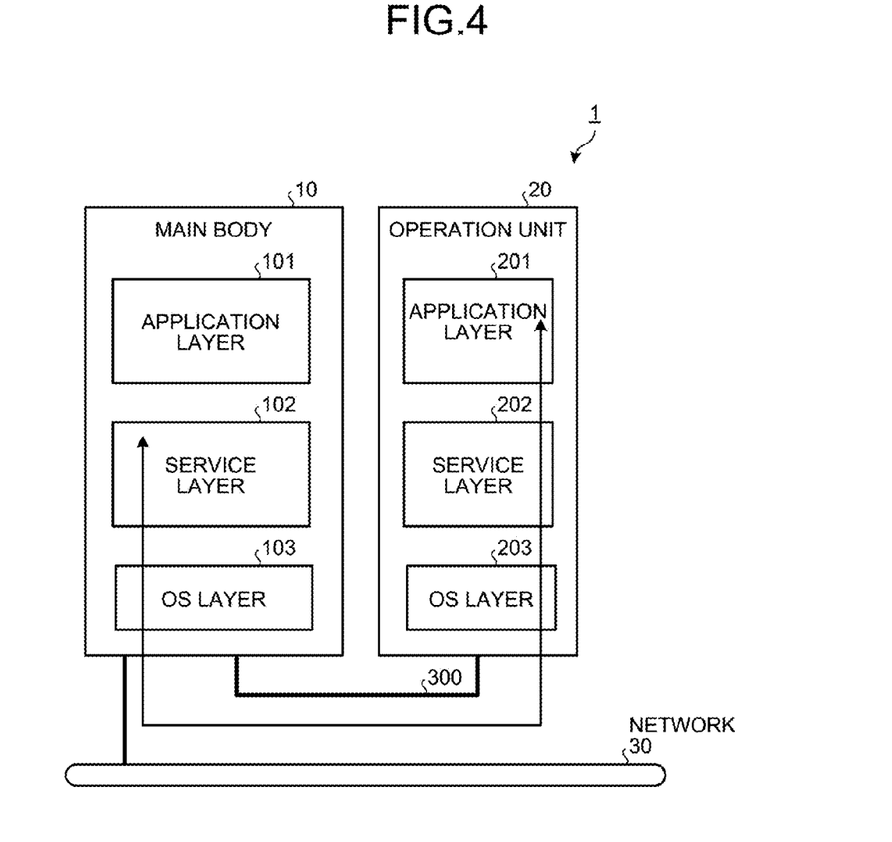
FIG. 4 illustrates an example of a software configuration of the MFP according to the embodiment.

Next, a software configuration of the MFP 1 will be explained. FIG. 4 illustrates a frame format of an example of a software configuration of the MFP 1. As illustrated in FIG. 4, the main body 10 is provided with an application layer 101, a service layer 102, and an OS layer 103. The substances of the application layer 101, the service layer 102, and the OS layer 103 are various softwares stored in the ROM 12 and the HDD 14. The CPU 11 executes these softwares, so that various functions are provided.

A software of the application layer 101 is an application software (hereinafter sometimes referred to simply as "app" or "application" in the explanation below) for providing a predetermined function by operating a hardware resource. For kinds of such applications, there are a copy application that provides a copying function, a scanner application that provides a scanning function, a facsimile application that provides a facsimile function, and a printer application that provides a printing function, for example.

A software of the service layer 102 intervenes between the application layer 101 and the OS layer 103 and provides, with respect to an application, an interface that enables using a hardware resource provided in the main body 10. More specifically, the software of the service layer 102 provides a function of receiving an operation request to the hardware resource and performing an arbitration of operation requests. The operation request received by the service layer 102 includes a request for scanning by a scanner and a request for printing by a plotter.

The interface function by the service layer 102 is provided not only to the application layer 101 of the main body 10 but also to an application layer 201 of the operation unit 20. Specifically, the application layer 201 (app) of the operation unit 20 is also able to realize functions using the hardware resource (the engine unit 17, for example) of the main body 10 via the interface function of the service layer 102.

A software of the OS layer 103 is a basic software (operating system) for providing a basic function of controlling the hardware provided in the main body 10. The software of the service layer 102 converts a request for using the hardware resource from applications of various kinds into a command which can be interpreted by the OS layer 103 and passes the command to the OS layer 103. The software of the OS layer 103 executes the command, so that the hardware resource operates in accordance with the request from the applications.

Similarly, the operation unit 20 is provided with the application layer 201, a service layer 202, and an OS layer 203. The hierarchical structure of the application layer 201, the service layer 202, and the OS layer 203 of the operation unit 20 is the same as that of the main body 10. However, the functions provided by the applications of the application layer 201 and the kinds of the operation requests which can be received by the service layer 202 are different from those of the main body 10. While an application of the application layer 201 may be a software for operating the hardware resource provided in the operation unit 20 and providing a predetermined function, the application of the application layer 201 includes a software chiefly for providing a function as a user interface (UI) that allows an operation and a display with regard to functions, i.e., the copying function, the scanning function, the facsimile function, and the printing function, provided in the main body 10.

To maintain an independence in function in the embodiment, the software of the OS layer 103 of the main body 10 is different from the software of the OS layer 203 of the operation unit 20. In other words, the main body 10 and the operation unit 20 independently operate with each other by separated operating systems. For example, the Linux (registered trademark) may be used for the software of the OS layer 103 of the main body 10 and the Android (registered trademark) may be used for the software of the OS layer 203 of the operation unit 20.

Since the power is supplied to the operation unit 20 from the main body 10 via the communication channel 300 in the embodiment, it is possible to control a power source of the operation unit 20 separately (independently) from the control of the power source of the main body 10.

Figure 5:
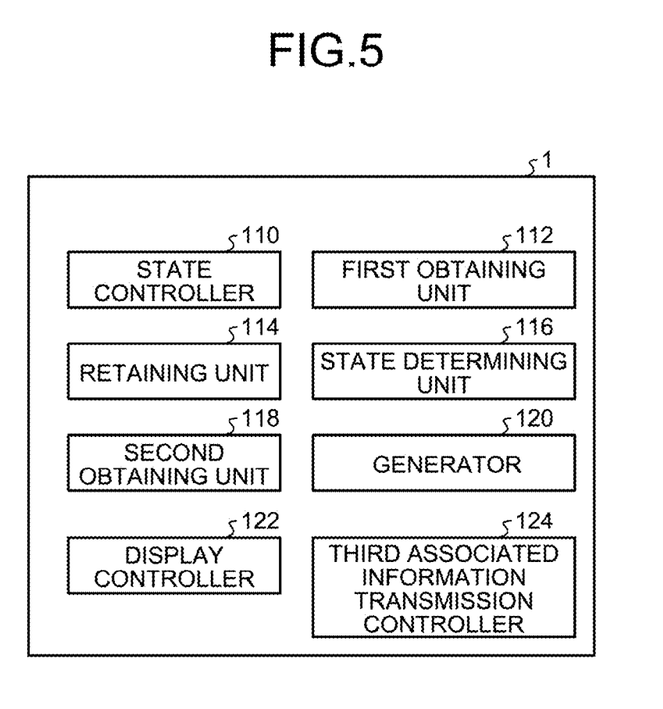
FIG. 5 illustrates an example of a functional configuration of the MFP according to the embodiment.

Next, a functional configuration of the MFP 1 will be explained. FIG. 5 illustrates an example of a functional configuration of the MFP 1. While only one MFP 1 is exemplified in FIG. 5, the same functional configuration applies to each of the other MFPs 1. As illustrated in FIG. 5, the MFP 1 is provided with a state controller 110, a first obtaining unit 112, a retaining unit 114, a state determining unit 116, a second obtaining unit 118, a generator 120, a display controller 122, and a third associated information transmission controller 124.

The state controller 110 performs a control of setting a state of the MFP 1, depending on conditions, to one of a first state and a second state in which a communication with the power collecting device 200 and the other MFPs 1 cannot be performed with lower power consumption than the first state. In this example, the first state indicates a state where power is supplied to each of the operation unit 20 and the main body 10 and the MFP 1 is able to operate normally. The second state indicates a state where the power consumption of the MFP 1 is almost zero. In the second state, a power supply, to elements other than portions related to a function of receiving an input that causes returning to the first state (an input by depressing a not-illustrated return switch, for example) and the function of the state controller 110, is stopped. In a configuration that the operation panel 26 needs a backlight like an LCD, the backlight is turned off and in a configuration that an HDD is equipped for a memory, a power for a motor of the HDD is turned off to reduce the power consumption, for example. In the second state, the MFP 1 is not able to communicate with the power collecting device 200 and obtain the first associated information from the power collecting device 200 in the period during which the second state is set.

Here, a condition of transiting to the first state or the second state can be arbitrarily set and, for example, a condition for the transition to the second state may be a reach to a preset time (late night hours with low possibility that the MFP 1 is used, for example) and may be a reception of an input via a depression of a not illustrated operation switch that causes a transition to the second state. Similarly, a condition for the transition to the first state may be a reach to a preset time (early morning hours with low possibility that the use of the MFP 1 is started, for example) and may be a reception of an input via a depression of the not-illustrated return switch.

Moreover, another state (a state where the power consumption is larger than the second state and smaller than the first state, for example) other than the first and the second states may be provided as the states of the MFP 1.

The first obtaining unit 112 illustrated in FIG. 5 regularly obtains the first associated information from the power collecting device 200 in the first state. The first obtaining unit 112 may obtain the first associated information every 60 seconds, for example. Whenever obtaining first associated information, the first obtaining unit 112 registers the obtained first associated information in the retaining unit 114 together with temporal information that indicates a time of the obtainment. Here, information in which the first associated information that is obtained by the first obtaining unit 112 and retained in the retaining unit 114 is associated with the temporal information that indicates the time when the first obtaining unit 112 obtains the first associated information is referred to as "second associated information".

The state determining unit 116 illustrated in FIG. 5 determines the state of the other MFP 1 in the first state. In the embodiment, the state determining unit 116 tries to communicate with the other MFP 1 via the network 30 and determines the state of the other MFP 1 depending on the presence of the response. Here, the state determining unit 116 determines that when the response from the other MFP 1 is present, the corresponding other MFP 1 is in the first state and when the response from the other MFP 1 is not present, the corresponding other MFP 1 is in the second state.

When the state of the MFP 1 transits from the second state to the first state (returns from a sleep mode to a normal mode), the second obtaining unit 118 illustrated in FIG. 5 obtains, from the corresponding other MFP 1, third associated information that indicates a portion corresponding to the period during which the MFP 1 is set to the second state in the second associated information retained in the retaining unit 114 provided in the other MFP 1 determined to be in the first state. The third associated information is considered to be information in which the temporal information that indicates the time in the period during which the MFP 1 is set to the second state is associated with the first associated information. When the state of the MFP 1 returns from the second state to the first state under the control by the state controller 110, the second obtaining unit 118 restarts the communication with the power collecting device 200 and tries a communication with the other MFP 1 in series. When the response from the other MFP 1 (sometimes referred to as "target MFP 1") with which the communication is tried is present and the target MFP 1 is confirmed not to be in the second state, the second obtaining unit 118 then requests third associated information from the target MFP 1. For the response, the second obtaining unit 118 receives (obtains) the third associated information from the target MFP 1.

The generator 120 illustrated in FIG. 5 generates third information that indicates a power consumption of each MFP 1 based on information in which the second associated information retained in the retaining unit 114 and the third associated information obtained by the second obtaining unit 118 are combined (merged). Since each MFP 1 retains connection information that indicates a preset connection relation between an outlet 40 and an MFP 1 in this example, the generator 120 is able to generate the third information that indicates a power consumption of each MFP 1 based on the merged information and the connection information. It is possible in the embodiment to complement information that indicates a power consumption at each outlet 40 in the period during which the MFP 1 is set to the second state by merging the second associated information retained in the retaining unit 114 and the third associated information obtained by the second obtaining unit 118. Specifically, the MFP 1 is able to obtain information that indicates a power consumption at each outlet 40 without omission even though the state of the MFP 1 shifts to the second state and there occurs a period during which the communication with the power collecting device 200 is disconnected.

The display controller 122 illustrated in FIG. 5 performs a control of displaying the third information. More specifically, the display controller 122 performs a control of displaying the third information generated by the generator 120 on the operation panel 26.

The third associated information transmission controller 124 illustrated in FIG. 5 performs, when receiving a request for third associated information from the other MFP 1 in the first state, a control of transmitting the requested third associated information to the corresponding other MFP 1. Specifically, when the third associated information that indicates a portion corresponding to a period during which the other MFP 1 is set to the second state in the second associated information retained in the retaining unit 114 is requested from the other MFP 1, the third associated information transmission controller 124 performs a control of transmitting the requested third associated information to the corresponding other MFP 1.

While the CPU (11 or 21) executes programs stored in the storage device (the ROM 12, the HDD 14, the ROM 22, and the flash memory 24, for example) to realize the functions of the units (the state controller 110, the first obtaining unit 112, the state determining unit 116, the second obtaining unit 118, the generator 120, the display controller 122, and the third associated information transmission controller 124) of the MFP 1 explained above, the present invention is not limited thereto and at least a part of the functions of the units of the MFP 1 may be, for example, realized by a dedicated hardware circuit (semiconductor integrated circuit and the like, for example). Moreover, the retaining unit 114 may be realized by the HDD 14 and the like of the main body 10 or by the flash memory 24 and the like of the operation unit 20, for example.

Figure 6:
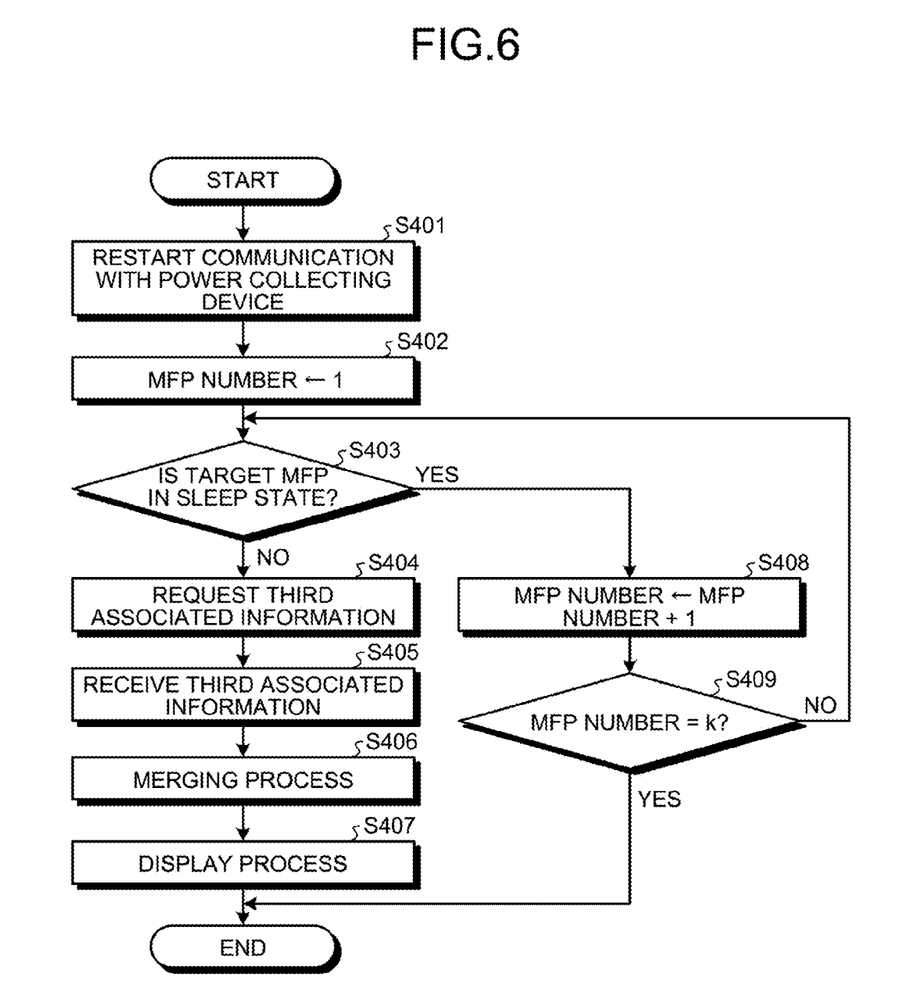
FIG. 6 is a flowchart showing an example of an operation of the MFP according to the embodiment.

Next, an example of an operation of the MFP 1 according to the embodiment will be explained. FIG. 6 is a flowchart showing an example of an operation in a case where a certain MFP 1 returns from the second state to the first state. Here, assumed for the explanation is a configuration that the number of MFPs 1, other than the certain MFP 1 having returned to the first state, is k (k≥2).

The first obtaining unit 112 first restarts the communication with the power collecting device 200 and restarts an obtainment of first associated information (step S401). Next, the state determining unit 116 sets a counter value that allows a subsequent processing to be repetitively performed to "1", which is an initial value (step S402). The state determining unit 116 next treats any one of MFPs 1 not selected as a target MFP 1 yet as a target MFP 1 and determines whether or not the target MFP 1 is in the second state (sleep state) (step S403).

When the target MFP 1 is determined not to be in the second state at step S403 ("No" at step S403), i.e., when the target MFP 1 is determined to be in the first state, the second obtaining unit 118 requests, from the target MFP 1, third associated information corresponding to information that indicates a power consumption at each outlet 40 in the period during which the certain MFP 1 is set to the second state (step S404) and receives (obtains) the third associated information from the target MFP 1 in response to the request (step S405). Next, the generator 120 performs a processing of merging the second associated information retained in the retaining unit 114 and the third associated information obtained at step S405 (step S406) and generates the third information that indicates a power consumption at each MFP 1 based on the merged information and the connection information. Next, the display controller 122 performs a control of displaying the generated third information (step S407).

On the other hands, when the target MFP 1 is determined to be in the second state at step S403 ("Yes" at step S403), the state determining unit 116 increments the counter value by "one" (step S408) and determines whether or not the counter value reaches "k" (step S409). When the counter value is determined to have reached "k" ("Yes" step S409), the processing directly ends. On the other hand, when the counter value is determined not to have reached "k" ("No" at step S409), the processing from step S403 is repeated.

Figure 7:
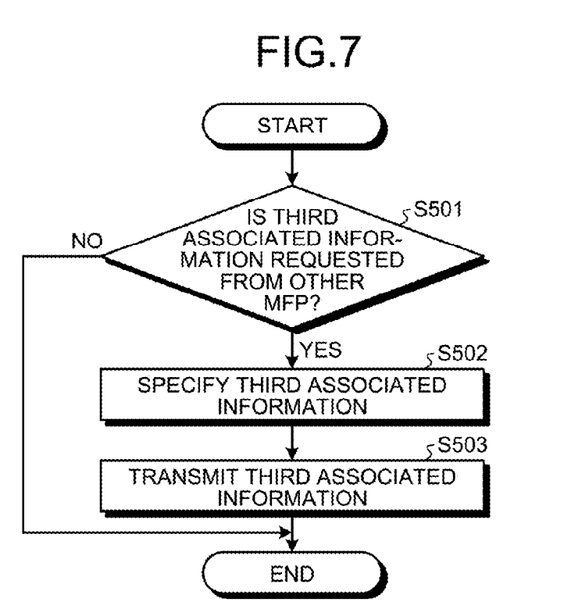
FIG. 7 is a flowchart showing an example of an operation of the MFP according to the embodiment.

Next, an example of an operation in a case where a certain MFP 1 receives a request for third associated information from any one of the other MFPs 1 in the first state will be explained. FIG. 7 is a flowchart showing an example of the operation in this case. As illustrated in FIG. 7, the third associated information transmission controller 124 determines whether or not the request for the third associated information from any one of the other MFPs 1 is present (step S501). When the request for the third associated information from the one of the other MFPs 1 is determined to be present ("Yes" at step S501), the third associated information transmission controller 124 specifies the third associated information that indicates a portion corresponding to the period during which the one of the other MFPs 1 is set to the second state in the second associated information retained in the retaining unit 114 (step S502). Here in this example, information that indicates the period during which the one of the other MFPs 1 is set to the second state is included in information requesting the third associated information from the one of the other MFPs 1. The third associated information transmission controller 124 performs a control of transmitting the third associated information specified at step S502 to the corresponding one of the other MFPs 1 (step S503).

As explained so far, even though the state of a certain MFP 1 shifts from the first state to the second state and there occurs a period during which a communication with the power collecting device 200 is disconnected (i.e., a period during which the first associated information cannot be obtained), it is possible in the embodiment to complement information that indicates a power consumption at each outlet 40 in the period during which the certain MFP 1 is set to the second state by obtaining, from any one of the other MFPs 1, third associated information that indicates a portion corresponding to the period during which the certain MFP 1 is set to the second state in the second associated information included in the one of the other MFPs 1 and merging the second associated information retained in the retaining unit 114 provided in the apparatus (the certain MFP 1) and the third associated information obtained from the one of the other MFPs 1 when the certain MFP 1 again returns to the first state. In other words, since the MFP 1 is able to obtain information that indicates a power consumption at each outlet 40 without omission even though the state of the MFP 1 shifts to the second state and there occurs a period during which a communication with the power collecting device 200 is disconnected, there is an advantage that the MFP 1 is able to obtain information that indicates a power consumption at each outlet 40 without omission while suppressing one's own power consumption.

While the embodiment according to the present invention is explained so far, the present invention is not limited to the embodiment as it is, and the constituents may be deformed and embodied without departing from the scope of the invention in a phase of embodiment. Various inventions may be formed by appropriately combining the multiple constituents disclosed in the embodiment above. For example, some constituents may be eliminated from all the constituents shown in the above embodiment. Besides, constituents over different embodiments may be combined arbitrarily.

MODIFICATIONS

Modifications will be explained below. Modifications below may be arbitrarily combined with each other. Besides, the modifications may be arbitrarily combined with the above embodiment.

First Modification

In a case where conditions for transition from the first state to the second state are met in an MFP 1 and the state determining unit 116 determines that all the other MFPs 1 are in the second state, the state controller 110 is able to perform a control of maintaining the first state without causing the transition to the second state, for example. At least one MFP 1 among the plurality of MFPs 1 provided in the system 100 keeps obtaining the first associated information from the power collecting device 200 with this configuration, so that any of the other MFPs 1 having returned from the second state to the first state is able to obtain information that indicates a power consumption at each outlet 40 in the period during which oneself is set to the second state without omission.

Second Modification

The state determining unit 116 is able to determine the state of other MFPs 1 based on the first associated information obtained by the first obtaining unit 112, for example. By retaining the connection information that indicates a preset connection relation between an outlet 40 and an MFP 1 and a threshold value of a power consumption volume for each MFP 1 (threshold value used for determining whether or not the apparatus is in the second state), each MFP 1 is able to determine whether or not other MFPs 1 are in the second state based on the first associated information obtained by the first obtaining unit 112 without a communication among MFPs 1, for example. Under a concern about an increase in a communication volume on the network with an increase in the number of MFPs 1 in a method of checking whether or not the other MFPs 1 are in the second state through a communication via the network, the present modification has an advantage that the state of the other MFPs 1 can be determined based on the first associated information obtained from the power collecting device 200 and a communication volume on the network can thereby be suppressed (traffic can be suppressed).

Third Modification

Each MFP 1 retains connection information which is set in advance in the embodiment above. For example, connection information may be set via an operation, by a user, of inputting connection information with respect to the operation unit 20 and depending on the input, however, a burden of the setting operation increases when the number of MFPs 1 increases. Here, a method of automatically generating connection information may be adopted, for example.

Figure 8:
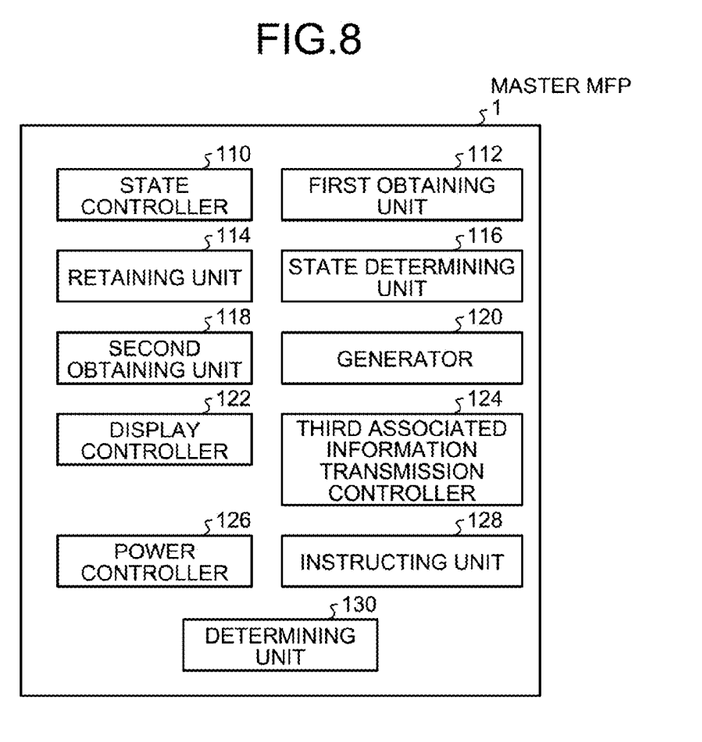
FIG. 8 illustrates an example of a functional configuration of an MFP according to a modification.

In this example, a case where one MFP 1 (sometimes referred to as "master MFP 1" in the explanation below) among the plurality of MFPs 1 includes the function of automatically generating connection information will be taken as an example and explained. In addition, the master MFP 1 includes a function of distributing the generated connection information to the other MFPs 1. The configuration will be explained below specifically. FIG. 8 illustrates an example of a functional configuration of the master MFP 1. As illustrated in FIG. 8, the master MFP 1 is further provided with a power controller 126, an instructing unit 128, and a determining unit 130.

The power controller 126 performs a control of changing a power consumption of one's own apparatus. The instructing unit 128 sequentially instructs the other MFPs 1 to change a power consumption. For example, the instructing unit 128 is able to sequentially instruct the other MFPs 1 to temporarily increase the power consumption or to temporarily decrease the power consumption. Since the MFP 1 is provided with a fixing heater, a writing laser, and the like, the instructing unit 128 instructs the other MFPs 1 to cause the fixing heater, the writing laser, and the like to shift to a ready state at which a preparation for printing is completed (only a ready state is set and printing is not executed) to enable increasing or decreasing the power easily (to change the power consumption easily), for example.

The determining unit 130 associates the MFP 1 that instructed the change of the power consumption with the outlet 40 whose power consumption changed based on the first associated information regularly obtained by the first obtaining unit 112 each time when the instruction is given by the instructing unit 128 to determine the connection information. For example, the determining unit 130 is also able to associate one's own apparatus (master MFP 1) with the outlet 40 whose power consumption changed based on the first associated information regularly obtained by the first obtaining unit 112 after the control of changing the power consumption of one's own apparatus is performed by the power controller 126 (after the control of temporarily increasing the power consumption is performed, for example). Here, the determining unit 130 is able to determine connection information, without the control of changing the power consumption of one's own apparatus, by associating the last outlet 40 which is left not associated with one's own apparatus after all the associations between the other MFPs 1 and the outlets 40 are completed, for example.

The present modification has an advantage that connection information can be generated automatically without the necessity of the operation of inputting connection information by a user and thereby convenience for users can be enhanced.

Fourth Modification

While the main body 10 and the operation unit 20 operate independently with each other in separated operating systems in the embodiment, the configuration is not limited thereto and the main body 10 and the operation unit 20 may operate in the same operating system, for example.

Fifth Modification

The functions of the units equipped in the MFP 1 may be arbitrarily distributed and equipped in the main body 10 and the operation unit 20.

Program

The program to be executed in the MFP 1 according to the embodiment may be provided by being recorded in a file of an installable format or of an executable format in a computer-readable recording medium such as a CD-ROM, a flexible disk (FD), a CD-R, a digital versatile disk (DVD), and a universal serial bus (USB), or may be provided or distributed via a network such as the Internet. Besides, various programs may be provided by being preloaded in a ROM and the like.

According to the embodiments, it is possible for an apparatus as a target for power consumption measurement to obtain power consumption information without omission while reducing one's own power consumption.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing system comprising:
a plurality of information processing apparatuses; and
a power collecting device configured to collect pieces of power consumption information at a plurality of power sources connected to the plurality of information processing apparatuses, respectively;
each of the information processing apparatuses including,
a memory having computer readable instructions stored thereon; and
at least one processor configured to execute the computer readable instructions to,
set the information processing apparatus to a first state or a second state based on at least one desired condition,
the second state including power consumption at the information processing apparatus being smaller than power consumption in the first state, and which indicates that communication with the power collecting device and the other information processing apparatuses cannot be performed while in the second state;
regularly obtain, from the power collecting device, first associated information including pieces of first information for identifying the respective plurality of power sources associated with pieces of second information indicating power consumption of the plurality of respective power sources;
retain second associated information in which the obtained first associated information is associated with temporal information indicating a time when the first associated information was obtained;
determine a state of the other information processing apparatuses;
obtain third associated information from the other information processing apparatuses when the information processing apparatus transitions from the second state to the first state, the third associated information indicating a portion corresponding to a period during which the information processing apparatus is in the second state, in the retained second associated information provided by the other information processing apparatuses determined to be in the first state;
generate third information that indicates power consumption of each of the information processing apparatuses based on information in which the retained second associated information is combined with the third associated information; and
a control displaying of the third information.

2. The information processing system according to claim 1, wherein the at least one processor for each of the information processing apparatuses is further configured to:
transmit a third associated information to the other information processing apparatuses while in the first state in response to a request from the other information processing apparatuses, the third associated information indicating that a portion corresponding to a period during which the other information processing apparatuses is in the second state in the retained second associated information.

3. The information processing system according to claim 1, wherein each of the at least one processor are configured to:
keep the respective information processing apparatus in the first state without causing a transition to the second state when all of the other information processing apparatuses are determined to be in the second state when conditions under which the state of the information processing apparatus transitions from the first state to the second state are met.

4. The information processing system according to claim 1, wherein each of the at least one processor are configured to determine the state of the other information processing apparatuses based on the obtained first associated information.

5. The information processing system according to claim 1, wherein the at least one processor of
any one of the plurality of information processing apparatuses is further configured to:
sequentially instruct the other information apparatuses to a change of power consumption;
associate the information processing apparatus of the plurality of information processing apparatuses to which the instruction of changing the power consumption is given with the power source whose power consumption changed, based on the obtained first associated information; and
determine connection information that indicates a connection relation between the information processing apparatus and the power source.

6. The information processing system according to claim 1, wherein the plurality of information processing apparatuses are configured to connect to the power collecting device and the other information processing apparatuses via a network.

7. The information processing system according to claim 1, wherein the first state is a state where the information processing apparatus is operating normally.

8. The information processing system according to claim 1, wherein the at least one desired condition is at least one of reaching a desired time condition, and reception of a desired user input.

9. An information processing apparatus comprising:
a memory having computer readable instructions stored thereon; and
at least one processor configured to execute the computer readable instructions to:
set the information processing apparatus to a first state or a second state based on at least one desired condition,
the second state including power consumption at the information processing apparatus being smaller than power consumption of the first state, and
indicates that communication with a power collecting device and another information processing apparatus cannot be performed, the power collecting device configured to collect pieces of power consumption information at power sources to which the information processing apparatuses are connected, respectively,
regularly obtain, from the power collecting device, first associated information including pieces of first information for identifying the respective power sources associated with pieces of second information indicating power consumption of the respective power sources;
retain second associated information including the obtained first associated information associated with temporal information indicating a time when the first associated information was obtained;
determine a state of the another information processing apparatus;
obtain third associated information from the another information processing apparatus when the information processing apparatus transitions from the second state to the first state, the third associated information indicating a portion corresponding to a period during which the information processing apparatus is in the second state, in the retained second associated information provided by the another information processing apparatus determined to be in the first state;
generate third information that indicates power consumption of each of the information processing apparatuses based on information in which the retained second associated information is combined with the third associated information; and
display the third information.

10. The information processing apparatus according to claim 9, further comprising:
a network controller configured to connect to the power collecting device and the other information processing apparatuses via a network.

11. The information processing apparatus according to claim 9, wherein the first state is a state where the information processing apparatus is operating normally.

12. The information processing apparatus according to claim 9, wherein the at least one desired condition is at least one of reaching a desired time condition, and reception of a desired user input.

13. An information processing method comprising:
setting, using at least one processor, an information processing apparatus to a first state or a second state based on at least one desired condition,
the second state including power consumption at the information processing apparatus being smaller than power consumption of the first state, and indicating that communication with a power collecting device and another information processing apparatus cannot be performed,
the power collecting device configured to collect pieces of power consumption information at a plurality of power sources to which the information processing apparatus and the another information processing apparatus are connected, respectively;
regularly obtaining, from the power collecting device, using the at least one processor, first associated information including pieces of first information identifying the respective plurality of power sources associated with pieces of second information indicating power consumption of the respective power sources;
retaining, using the at least one processor, second associated information in which the first associated information is associated with temporal information indicating a time when the first associated information was obtained;
determining, using the at least one processor, a state of the another information processing apparatus;
obtaining, using the at least one processor, third associated information from the another information processing apparatus when the information processing apparatus transitions from the second state to the first state, the third associated information indicating a portion corresponding to a period during which the information processing apparatus is in the second state, in the second associated information provided by the another information processing apparatus determined to be in the first state;
generating, using the at least one processor, third information that indicates power consumption of each of the information processing apparatuses based on information in which the second associated information is combined with the third associated information; and
displaying, using the at least one processor, the third information.

14. The information processing method according to claim 13, wherein the plurality of information processing apparatuses are configured to connect to the power collecting device and the other information processing apparatuses via a network.

15. The information processing method according to claim 13, wherein the first state is a state where the information processing apparatus is operating normally.

16. The information processing method according to claim 13, wherein the at least one desired condition is at least one of reaching a desired time condition, and reception of a desired user input.

* * * * *